UNITED STATES PATENT OFFICE.

ALBRECHT SCHMIDT, OF HÖCHST-ON-THE-MAIN, GERMANY, ASSIGNOR TO FARBWERKE, VORM. MEISTER, LUCIUS & BRÜNING, OF HÖCHST-ON-THE-MAIN, GERMANY, A CORPORATION OF GERMANY.

SULFUR DYE AND PROCESS OF MAKING SAME.

No. 818,980.   Specification of Letters Patent.   Patented April 24, 1906.

Application filed July 31, 1905. Serial No. 271,937.

*To all whom it may concern:*

Be it known that I, ALBRECHT SCHMIDT, Ph. D., a citizen of the Empire of Germany, residing at Höchst-on-the-Main, Germany, have invented certain new and useful Improvements in the Manufacture of Red, Dark-Red to Violet Sulfurized Dyestuffs, of which the following is a specification.

The present process relates to the manufacture of red, dark-red to violet sulfurized dyestuffs which are distinguished from those already known by their fastness to light and the redness of their tints. The process consists in heating hydroxylated azins or their alkyl, aryl, sulfonic, carboxylic, and like derivatives or their sulfurized derivatives with alkali polysulfid in presence of copper or of copper compounds. It has been found that the copper in this case plays an entirely unexpected part. In the first place the color tone of the sulfurized product obtained with addition of copper compounds from hydroxylated azins is in by far the majority of cases much redder and because at least equally clear consequently much more valuable than the color tone of the known dyestuffs obtained by melting hydroxylated azins with polysulfid without addition of copper or copper compounds, so that the dyestuffs here in question even on this ground are to be designated completely different. The action of the copper is the more surprising as the dyeings of the known sulfurized dyestuffs obtained by melting hydroxylated azins with polysulfid when treated with copper on the fiber tend to become muddy blue, not red, much less than clear red. Moreover, the new dyestuffs exhibit the property of being much faster to light. It has been found, further, that similar new dyestuffs may be obtained from the already completely or partially sulfurized hydroxylated azins if these are subjected to subsequent heating with copper and alkali polysulfid.

The transformation of the hydroxylated azins into the new dyestuffs can be effected both by means of the so-called "melting" process advantageously with use of a reflux condenser, whereby a predetermined temperature and concentration may be maintained as far as possible, and more frequently by boiling an aqueous or alcoholic solution of the material and the sulfid or an aqueous solution of the sulfid containing the material suspended in it or in alcoholic solution, and the known modifications for other sulfurized dyestuffs (variation of time, temperature, concentration, proportion of alkali polysulfid) may be used; but then the dyestuffs will vary slightly in their properties. The remarkable effect of the copper is, however, always the same. Preferably the operation is conducted in an enameled or lead-lined vessel. Iron has some influence on the tint. If the so-called "melting" is carried out in copper vessels, the copper enters into the mass from the walls of the vessel. Copper vessels are less practical than the addition of copper, in so far that the taking up of copper from the walls of the vessel cannot be so well controlled and the action of the copper may go too far. The proportion of copper or copper compound can be varied within wide limits.

Example I: Fifteen parts of the hydrochlorid of the amidoöxyphenazin

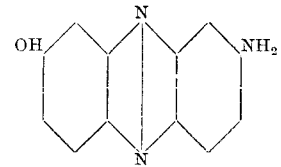

are heated with about eighty-three parts of crystallized sodium sulfid, thirty-eight parts of sulfur, and 10.5 parts of crystallized copper sulfate dissolved in twenty parts of hot water, the heating being at first with evaporation of water at about 110° centigrade and then for about five hours under a reflux condenser. The mass can be used directly for dyeing, or the dyestuff may be precipitated with air, acids, or the like. The dyestuff thus obtained dyes bluish copper-red in an alkali-sulfid bath.

Example II: For the oxyphenazin specified in Example I is substituted the homologue wherein $CH_3$ takes the place of hydrogen in the ortho position relatively to the $NH_2$ group (from the indophenol:-para-amidophenol metatoluylenediamin.) An entirely similar somewhat yellower dyestuff is thus obtained. Similarly behaves, for example, the oxyphenazin sulfonic acid from dinitrochlorbenzene and para-amido-ortho sulfonic acid.

Example III: Fifteen parts of the hydrochlorid of ortho-ortho-dichloroxyazin

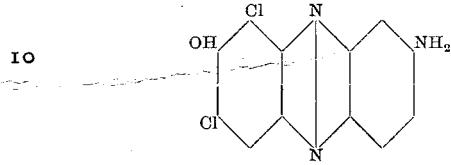

are heated while stirring with about eighty-three parts of crystallized sodium sulfid, 37.5 parts of sulfur, and a quantity of copper-sulfid paste corresponding with 10.5 parts of crystallized copper sulfate or a quantity of copper powder or copper bronze corresponding with the said quantity of crystallized copper sulfate at about 108° centigrade until water has been expelled and then under a reflux condenser or not for a further time at the same temperature. The chlorin atoms are eliminated during this operation. When the displacement of chlorin is finished or the formation of dyestuff is at an end, the mass may be dried by cautious evaporation or the dyestuff is precipitated with air or acids. With this there can be combined, if necessary, as in the case of the aforesaid and the following dyestuffs, a further purification of the dyestuff by adding sodium sulfid to the mass diluted with water, separating from a small proportion of a somewhat muddily-dyeing product and blowing air through the filtrate. The mass obtained by the melting process or the dyestuff thus separated dyes a dark red in a sodium-sulfid bath of much redder tint than the dye obtained from the dyestuff made without the addition of copper. The fastness to light is remarkable.

Example IV: If for the hydroxylated azin specified in the preceding example the corresponding homologue (from metatoluylenediamin and ortho-ortho-dichloro-para-amidophenol) be substituted, a completely-analogous dyestuff is obtained. In these examples the operation may also be such that the chlorin is first removed by means of alkali sulfid or sulfydrate or the like under pressure and the mixture then heated with polysulfid and copper sulfid or first with polysulfid and then preferably with a still further addition of polysulfid with copper sulfid.

Example V: If for the dichloro derivatives specified in Examples III and IV the corresponding monochloro derivatives from ortho-chloro-para-amidophenol are substituted, there are obtained quite similar dyestuffs of very similar tint.

Example VI: Quite different tints are obtained if instead of the foregoing hydroxylated azins, in which there is no group attached to the azin nitrogen, there are used safraninones, such as phenosafranione

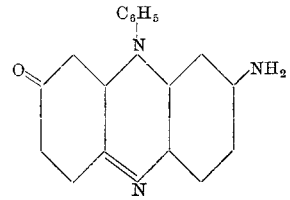

or derivatives thereof having substitutents in the phenyl ring—as, for instance, tolusafraninone

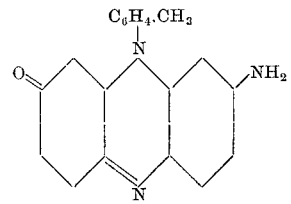

obtained from the safranin manufactured by means of paratoluidin or orthotoluidin as the final molecule, or xylosafraninone, similarly made with aid of xylidin.

Fifteen parts of phenosafraninone are heated gradually to about 135° centigrade while well stirring with about eighty-five parts of crystallized sodium sulfid, 37.5 parts sulfur, and a quantity of copper-sulfid paste corresponding with 10.5 parts of crystallized copper sulfate. The heating is with a reflux condenser at about 135° to 145° centigrade, while from time to time water is added in order to render fluid again the thickened mass, and then the temperature is allowed to rise again. When the formation of dyestuff is at an end, the mass is dried or the dyestuff is precipitated, whereby small proportions of a redder constituent-lacking fastness can be separated. The dyestuff dyes a very beautiful strong reddish violet in high degree fast to light. The dyestuff is distinguished from that obtained without addition of copper by its much redder tint and much greater fastness to light.

Example VII: Two hundred parts of a dyestuff mass obtained by heating for about two hours one part of phenosafraninone with three parts of sulfur at about 195° centigrade are dissolved in three hundred and twenty parts of melted sodium sulfid ($Na_2S + 9H_2O$) and forty parts of sulfur, and the mixture is heated with addition of a paste of copper sulfid made by precipitating forty parts of crystallized copper sulfate (dissolved in fifty parts of water) and forty parts of crystallized sodium sulfid (dissolved in fifty parts of water) and draining the copper sulfid formed. The heating operation is preferably conducted in such a manner that the temperature rises gradually to 135° centigrade, whereupon a reflux condenser is brought into use and the heat continued at about 135° to 140° centigrade until the formation of dyestuff is completed—that is to say, until the tint no longer changes and the maximum degree of fastness has been attained. The mass can be used directly for dyeing or the dyestuff may be precipitated from the aqueous solution with air or acid or like means. The mass dyes cotton in an alkali-sulfid bath bright-red violet tints of great fastness, especially to light, and of great intensity of color. Smaller proportions of copper vary the tint less toward red; larger proportions more toward red. Heating more strongly makes the dyestuff faster, but at the same time easily makes it somewhat muddy.

By substituting for the aforesaid dyestuff mass from phenosafraninone the analogous mass, but produced at a somewhat higher temperature (about 200° centigrade) from tolusafraninone (made from tolusafranin with paratoluidin or orthotoluidin as the final molecule) a still redder product is obtained. The mass obtained by heating with sulfur the xylosafraninone prepared with metaxylidin as final molecule behaves similarly.

Example VIII: From phenosafranol a reddish violet dyestuff is obtained by a quite analogous treatment. It is, however, less fast than that from phenosafraninone.

Example VIII$^a$: When for dichloro-safranol, for instance, dibromo-pheno-safraninone is substituted, a still faster, very beautiful, red-violet dyestuff is obtained.
In this case it is preferable to gradually raise the temperature of the melt higher than described in Example III. The dyestuff thus obtained is characterized by great fastness to light. The dibromo-safraninone serving as parent material may be easily obtained in the following manner: 57.4 parts of phenosafraninone are stirred together with five hundred parts of very concentrated hydrochloric acid. While cooling and stirring the dye is gradually treated with seventy-two parts of bromin. The product evaporized to dryness is stirred together with alkaline water, filtered, and used as a paste for the above melt. In a similar manner may be obtained the brominated or chlorinated homologues of safraninone of which those that are derived from the safraninones obtained from paratoluidin, orthotoluidin, xylidin, &c., as final molecule are specially suitable.

Example IX: Totally different tones are obtained if instead of the safraninones proper the safraninones of the fatty series, manifestly of quinoid constitution in contrast with the simple hydroxylated azins not alkylated at the azin nitrogen like the aromatic safraninones, are used. These safraninones have hitherto not been converted into sulfurized dyestuffs; but they yield such dyestuffs of quite surprising clearness and redness of tint. For example, the hitherto unknown ethosafraninone

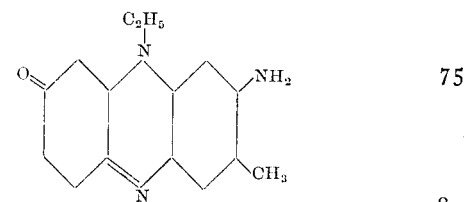

made, for instance, from para-nitroso phenol and meta-monoethyltoluylenediamin, yields according to the foregoing process a bordeaux red of previously unattained clearness and beauty of tint and of an extraordinarily much greater fastness to light than that of the dyestuff made without copper.

Ten parts of the aforesaid ethosafraninone from para-nitroso-phenol and monoethyl-meta-toluylenediamin

$$(C_2H_5 : NH_2 : CH_3 = 1:3:4)$$

are heated at about 135° centigrade while stirring with fifty parts of sodium sulfid, twenty-five parts of sulfur, and the copper-sulfid paste made from seven parts of crystallized copper sulfate and seven parts of crystallized sodium sulfid. The heating is conducted so as to distil away part of the water, and then under a reflux condenser with continued stirring until the formation of dyestuff is complete. The dried mass or the dyestuff isolated therefrom dyes cotton in an alkali-sulfid bath a very beautiful clear bordeaux red. By the use of the above-described method of purification a somewhat still clearer tint is obtained. Quite similar tints are yielded. By methosafraninone, as well as by the chlorin substitution products from chlorinated amidophenols and by para-amidophenol-sulfonic acid, para-amidophenol-ortho-carbonic acid, para-amido-ortho-cresol, &c., or by benzyl-meta-toluylene diamin, &c.

Having now described my invention, what I claim is—

1. The herein-described process for the manufacture of red, dark-red to violet sulfurized dyestuffs, which consists in heating hydroxylated azins and sulfurized dyestuffs derived therefrom with alkali-polysulfid in presence of substances containing copper.

2. The product obtained by heating hydroxylated azins and sulfurized dyestuffs derived therefrom with alkali polysulfid in presence of substances containing copper, being soluble in sulfids of alkali metals when heated, dyeing unmordanted cotton red, dark red to violet in a bath of sulfids of alkali metals, the dyeings thus obtained turning muddy and afterward mostly blue when treated on the fiber with copper salts.

In testimony that I claim the foregoing as my invention I have signed my name in presence of two subscribing witnesses.

ALBRECHT SCHMIDT.

Witnesses:
 JEAN GRUND,
 CARL GRUND.